United States Patent
Lindblom et al.

(10) Patent No.: US 9,112,396 B2
(45) Date of Patent: Aug. 18, 2015

(54) THERMOSTAT CLAMP FOR ELECTRIC MOTORS

(71) Applicants: John S. Lindblom, Golden Valley, MN (US); Matthew McDonald, Atikin, MN (US)

(72) Inventors: John S. Lindblom, Golden Valley, MN (US); Matthew McDonald, Atikin, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 255 days.

(21) Appl. No.: 13/888,470

(22) Filed: May 7, 2013

(65) Prior Publication Data

US 2014/0333185 A1    Nov. 13, 2014

(51) Int. Cl.
   *H02K 11/00*    (2006.01)
   *H02K 15/00*    (2006.01)

(52) U.S. Cl.
   CPC ............ *H02K 11/0047* (2013.01); *H02K 15/00* (2013.01); *H02K 11/0057* (2013.01); *Y10T 29/49009* (2015.01)

(58) Field of Classification Search
   CPC ................... H02K 11/0047; H02K 11/0057
   USPC ............................................ 310/68 C; 29/596
   See application file for complete search history.

(56) References Cited

U.S. PATENT DOCUMENTS

| | | | | |
|---|---|---|---|---|
| 4,028,570 | A * | 6/1977 | Kieffer et al. | 310/68 C |
| 5,631,509 | A * | 5/1997 | Crowell | 310/68 C |
| 6,153,954 | A * | 11/2000 | Uchida et al. | 310/68 C |
| 2001/0011854 | A1* | 8/2001 | Heyden et al. | 310/254 |
| 2008/0100184 | A1* | 5/2008 | Fargo et al. | 310/68 C |
| 2009/0140614 | A1* | 6/2009 | Heim | 310/68 C |

* cited by examiner

*Primary Examiner* — Hanh Nguyen
(74) *Attorney, Agent, or Firm* — Fay Sharpe LLP

(57) ABSTRACT

An electric motor assembly including a housing, a rotor, a stator supported in the housing, the stator having a plurality of individual windings, at least one thermostat for monitoring a temperature of at least one winding, and a thermostat clamp interposed between adjacent windings of the stator, the thermostat confined between the thermostat clamp and at least one winding.

20 Claims, 7 Drawing Sheets

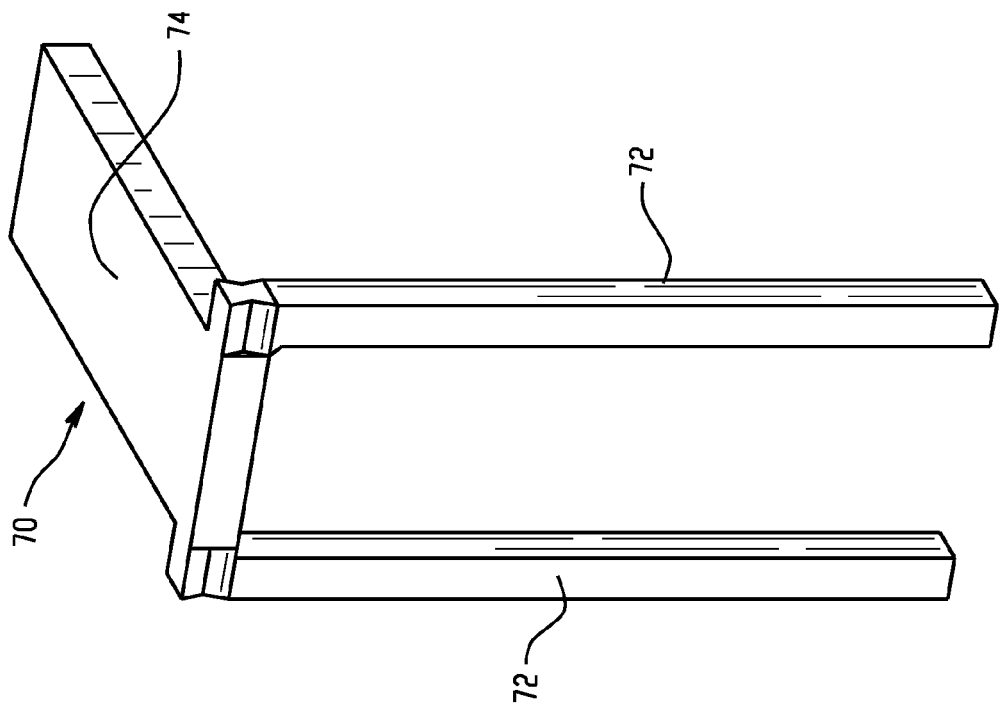
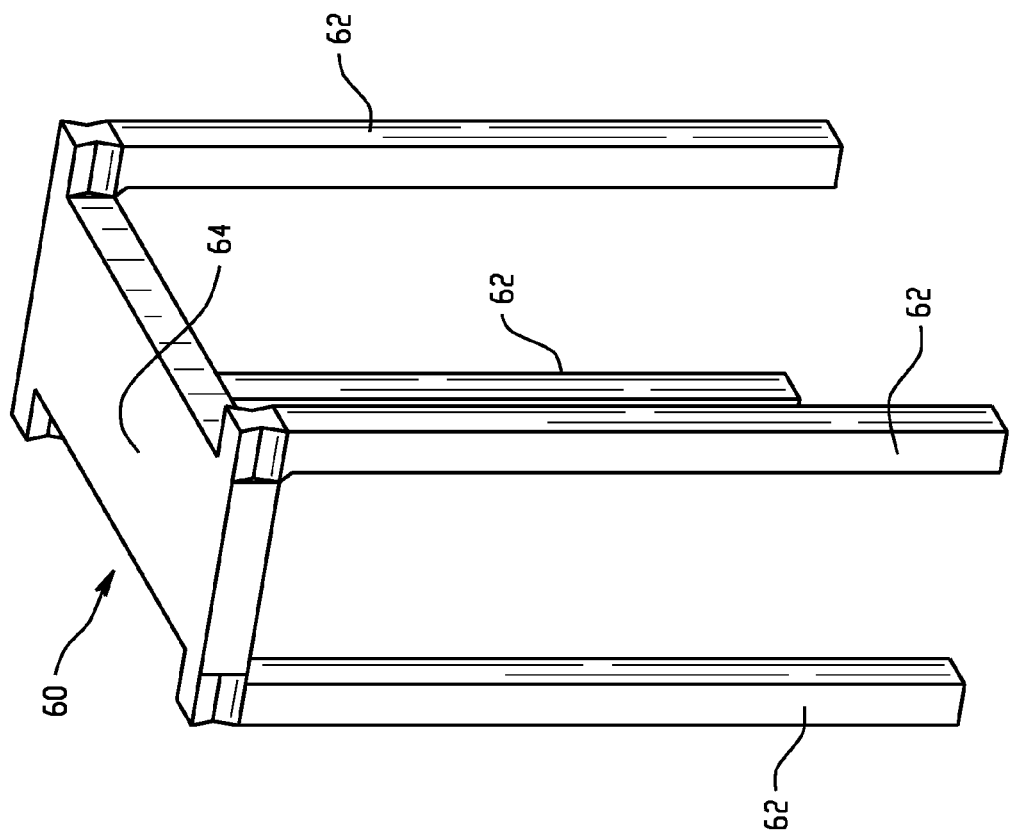

THERMOSTAT CLAMP FOR ELECTRIC MOTORS

BACKGROUND

The present exemplary embodiment relates to electric motors. It finds particular application in conjunction with the assembly of electric motors having one or more thermostats, and will be described with particular reference thereto. However, it is to be appreciated that the present exemplary embodiment is also amenable to other like applications.

During the assembly of an electric motor, a stator assembly is often first mounted into a housing and secured therein with a suitable potting material. In some motor assemblies, there are one or more thermostats that are mounted next to individual windings of the stator. Such thermostats monitor stator winding temperatures and send a signal to a motor controller or other device configured to cut electrical power supplied to the motor in the event of an over-temperature condition.

Each thermostat typically is held or clamped in position during the potting process to ensure that it remains in its proper position until the potting material is cured. Current approaches include utilizing a steel tool that is fastened to a potting plug (a temporary component inserted into the center of the stator during potting). The tool has adjustable arms that are configured to hold one or more thermostats in place during the potting process. After the potting process is complete, the tool is removed and then reused for assembling another electric motor.

FIG. 1 illustrates a prior art thermostat clamp that generally includes a Y-shaped component 10 mounted at its center to a casting plug 12 with a screw 14. The Y-shaped component supports three clamp elements 16 at distal ends of each individual arm of the component 10. The clamp elements 16 can be adjusted to clamp individual thermostats 18 in place on individual coils 20 of a stator 22. It will be appreciated that, in use, the prior art clamp is generally first mounted to the casting plug 12 with the screw 14 and then the thermostats 18 are positioned beneath the clamping elements 16 which are then tightened to secure the thermostats 18 in position on respective windings 20. Potting material (not shown) is then poured into the space between the casting plug 12 and a motor housing 24 in which the stator 22 and thermostats 18 are located.

As can be appreciated, positioning the individual elements and thermostats is difficult and once the potting process is complete, the clamp needs to be removed from the motor assembly prior to assembly of further motor components. Such tooling is cumbersome, breaks frequently, and does not always hold the thermostat in a correct position during potting. In addition, the tooling can limit access to the windings during the potting process making it more difficult for the potting material to be poured into the stator cavity.

BRIEF DESCRIPTION

In accordance with one aspect, an electric motor assembly comprises a housing, a rotor, stator supported in the housing, the stator having a plurality of individual windings, at least one thermostat for monitoring a temperature of at least one winding, and a thermostat clamp interposed between adjacent windings of the stator, the thermostat confined between the thermostat clamp and at least one winding.

The thermostat clamp can include a leg portion friction-fit between adjacent windings of the stator, and a head portion extending from the leg portion engaged with the thermostat. The leg portion can include a friction pad comprising a thickened portion thereof. The thermostat clamp includes a portion thereof that is generally T-shape in cross-section. The thermostat clamp can further comprise first and second spaced apart legs adapted to be received between adjacent windings. The thermostat clamp can be comprised of a non-conductive material, such as rynite-fr945. The electric motor assembly can further comprise potting material surrounding at least a portion of the stator, thermostat, and thermostat clamp.

In accordance with another aspect, a stator assembly comprises a housing, a stator supported in the housing, the stator having a plurality of individual windings, at least one thermostat for monitoring a temperature of at least one winding, and a thermostat clamp interposed between adjacent windings of the stator, the thermostat confined between the thermostat clamp and at least one winding.

The thermostat clamp can include a leg portion friction-fit between adjacent windings of the stator, and a head portion extending from the leg portion engaged with the thermostat. The leg portion can include a friction pad comprising a thickened portion thereof. The thermostat clamp can have a portion thereof that is generally T-shape in cross-section. The thermostat clamp can further comprise first and second spaced apart legs adapted to be received between adjacent windings. The thermostat clamp can be comprised of a non-conductive material, including rynite-fr945. The stator assembly can further comprise potting material surrounding at least a portion of the stator, thermostat, and thermostat clamp.

In accordance with another aspect, a method of assembling an electric motor comprises locating a stator having multiple windings within a housing, positioning a thermostat relative to a winding of the stator and clamping the thermostat in place with a thermostat clamp, the clamping including inserting a leg of a thermostat clamp between adjacent windings of the stator, the thermostat clamp having a thickness slightly larger than a spacing between the adjacent windings whereby the thermostat clamp is frictionally retained, and potting said stator, thermostat and thermostat clamp within the housing.

The clamping can further include positioning a head portion of the thermostat clamp in engagement with the at least one thermostat. The potting can include installing a casting plug in the stator prior to applying a potting material. The method can also include removing the casting plug and installing a rotor in its place.

BRIEF DESCRIPTION OF THE DRAWINGS

FIG. 7 is another exemplary thermostat clamp in accordance with the present disclosure; and FIG. 8 is another exemplary thermostat clamp in accordance with the present disclosure.

DETAILED DESCRIPTION

Figure 1:
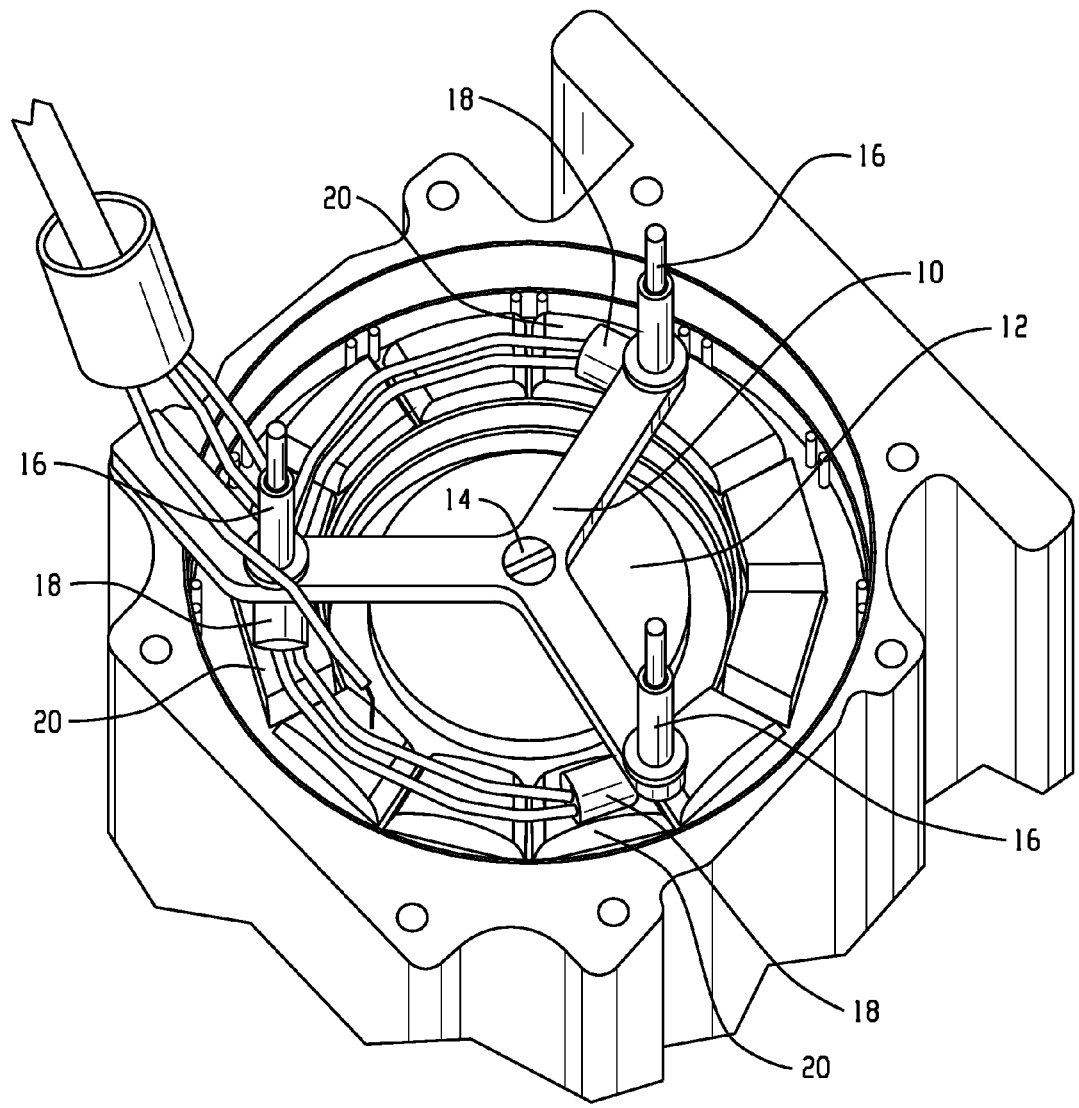
FIG. 1 is a perspective view of a prior art thermostat clamp in position on a partially assembled electric motor.
Figure 2:
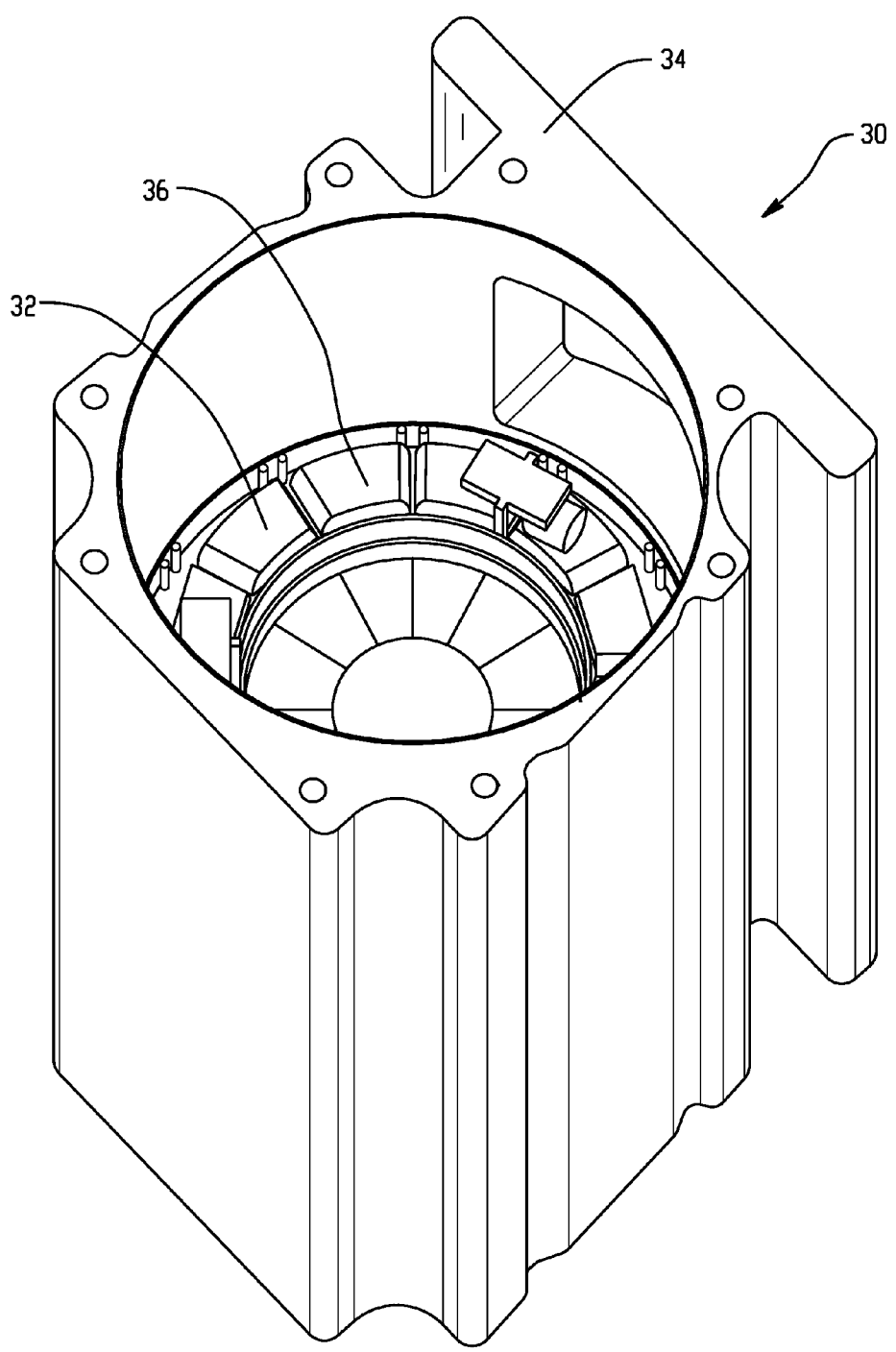
FIG. 2 is an exemplary electric motor assembly including a thermostat clamp in accordance with the present disclosure.
Figure 3:
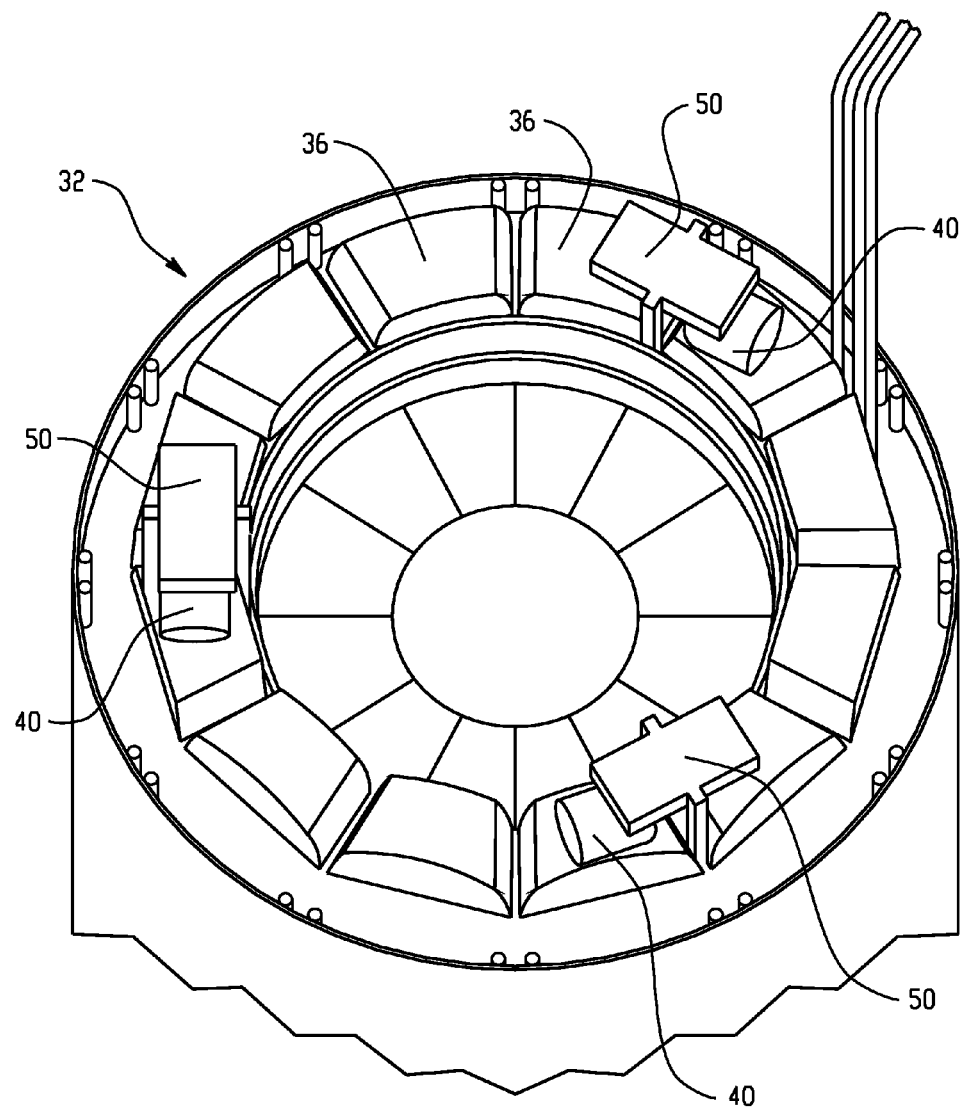
FIG. 3 is a perspective overhead view of a stator assembly of the electric motor assembly of FIG. 2.
Figure 4:
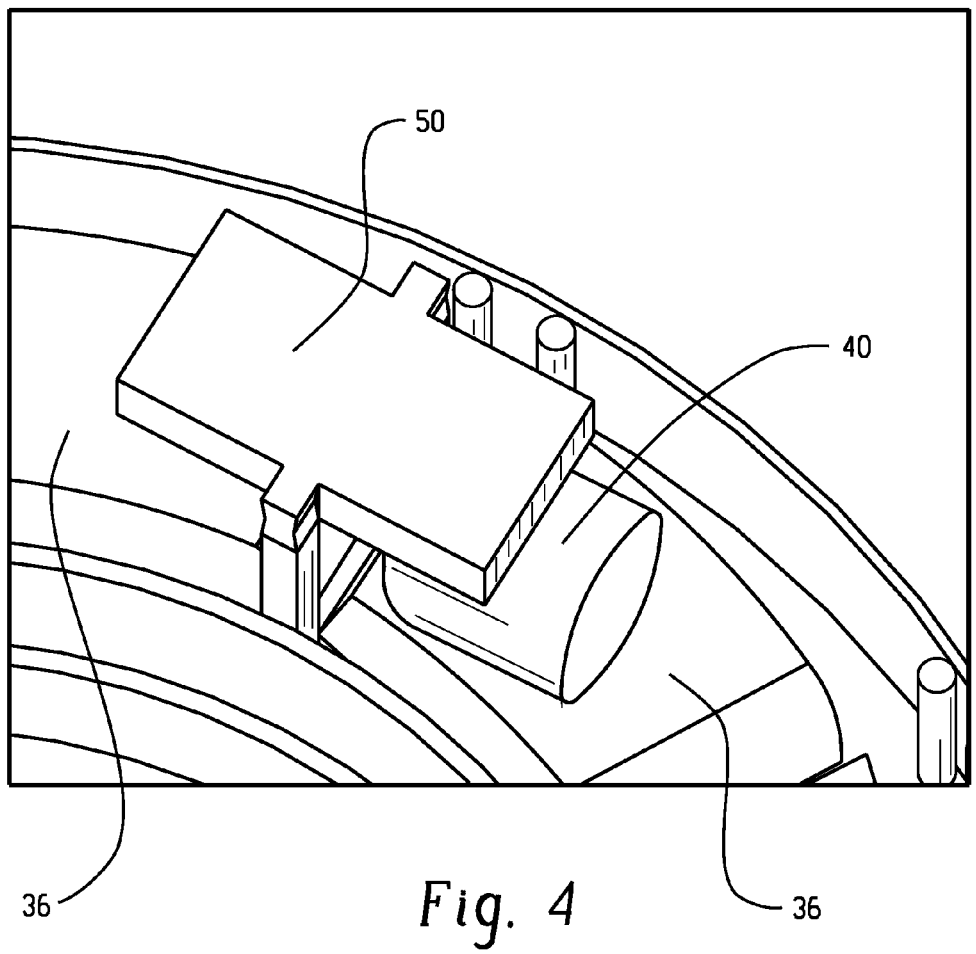
FIG. 4 is an enlarged portion of the stator assembly of FIG. 3.

With reference to FIGS. 2-4, and initially to FIG. 2, an exemplary motor assembly in accordance with the present disclosure is generally identified by reference numeral 30. The motor assembly 30 is illustrated in a partially assembled state wherein a stator assembly 32 is positioned within a central cavity of a motor housing 34. The stator assembly 32 is a generally annular structure and is received in a corresponding cylindrical portion of the central cavity of the housing 34. The stator assembly 32 comprises, among other things, a plurality of individual windings 36 arranged concentrically about a central opening 38.

Turning to FIGS. 3 and 4, three thermostat elements 40 are arranged about the stator assembly 32 at approximately 120° intervals. Each of the thermostat elements 40 is positioned atop an individual winding 36 of the stator assembly 32. A thermostat clamp 50 secures each thermostat element 40 in place atop its respective winding 36. Although three thermostats are illustrated, it will be appreciated that a single thermostat may be sufficient for some applications.

Figure 5:
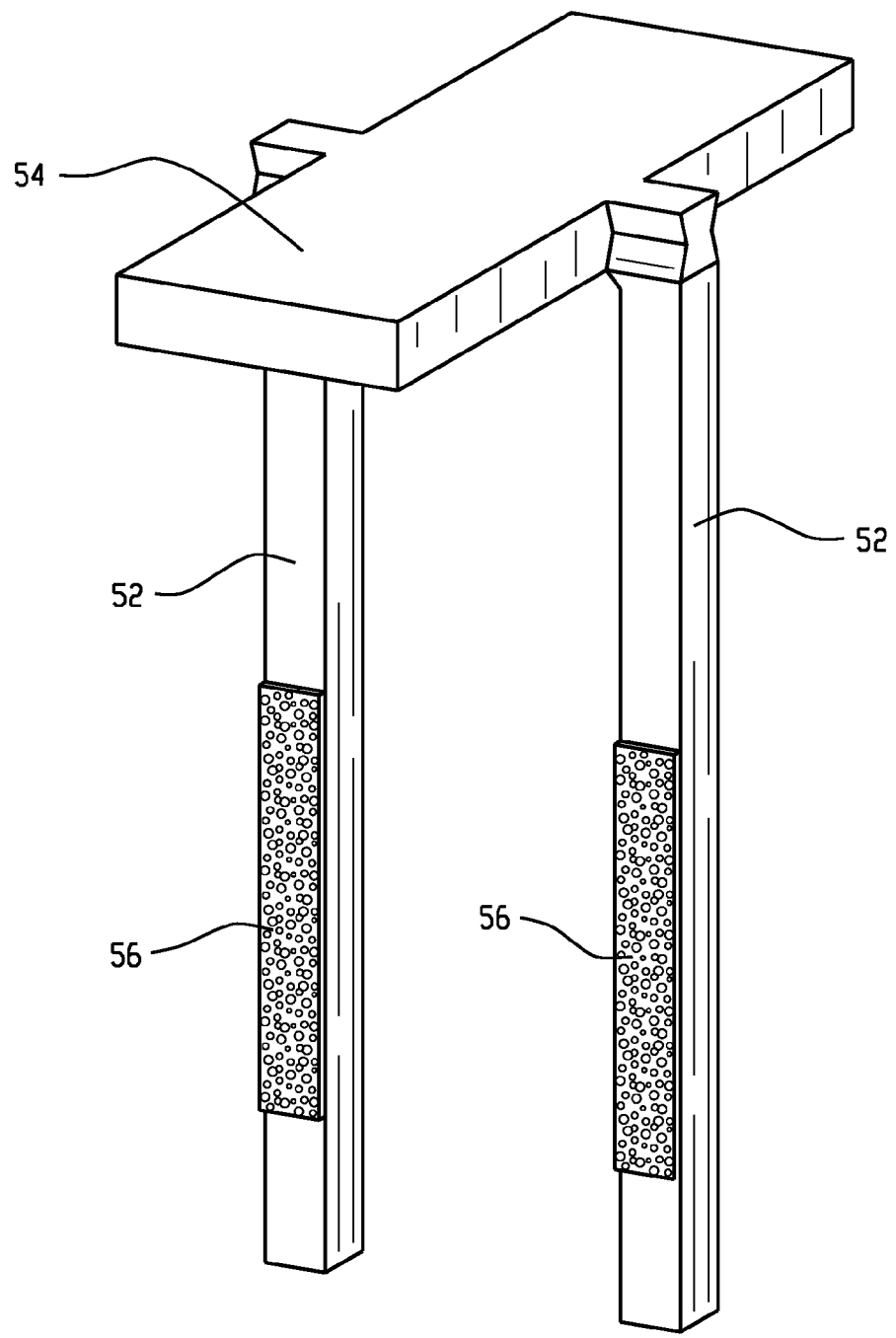
FIG. 5 a perspective view of the exemplary thermostat clamp of FIGS. 2-4.

As best seen in FIGS. 4 and 5, each thermostat clamp 50 is generally T-shape in cross-section. In the illustrated embodiment, the "leg" of the t-shape comprises two spaced apart legs that are received in the space between adjacent windings 36. Accordingly, the legs 52 of the thermostat clamp 50 are dimensioned such that they are tightly received within said space, thereby creating a friction or compression fit. This compression fit secures the thermostat clamp 50 in place with an arm 54 (upper portion) of the T-shape cross-section of the thermostat clamp 50 in contact with the thermostat element 40 whereby the thermostat element 40 is held in place atop a winding 36. Once the thermostat clamp 50 is in position, the thermostat element 40 is secured and both the thermostat element 40 and the thermostat clamp 50 can then be potted in place, with the thermostat clamp 50 remaining in the stator assembly 32 after the potting process.

As best seen in FIG. 5, the thermostat clamp 50 includes friction pads 56, portions of the legs 52 having an increased thickness. Such friction pads 56 extend only along a portion of the length of each leg and are configured to ensure a tight friction fit between the windings. In some embodiments, the friction pads can include a textured surface or can include an overmolded material to enhance grip.

It will be appreciated that the thermostat clamp 50 can be used to secure two thermostat elements 40 to adjacent windings 36. This can be done, for example, by positioning a thermostat element 40 under each of the arms 54 of the thermostat clamp 40.

The thermostat clamp 50 has multiple advantages over the prior art clamps including that virtually any number of thermostat elements can be secured in place by using a plurality of thermostat clamps 50. Prior art clamps required additional clearances and therefore were limited in the number of thermostat elements that could be placed. The thermostat claim 50 is a single-use element that remains in the electric motor occupying space that otherwise would be filled with potting material. This makes the thermostat clamp 50 much easier to use and eliminates labor costs associated with removal of prior art clamps after the potting process.

Figure 6:
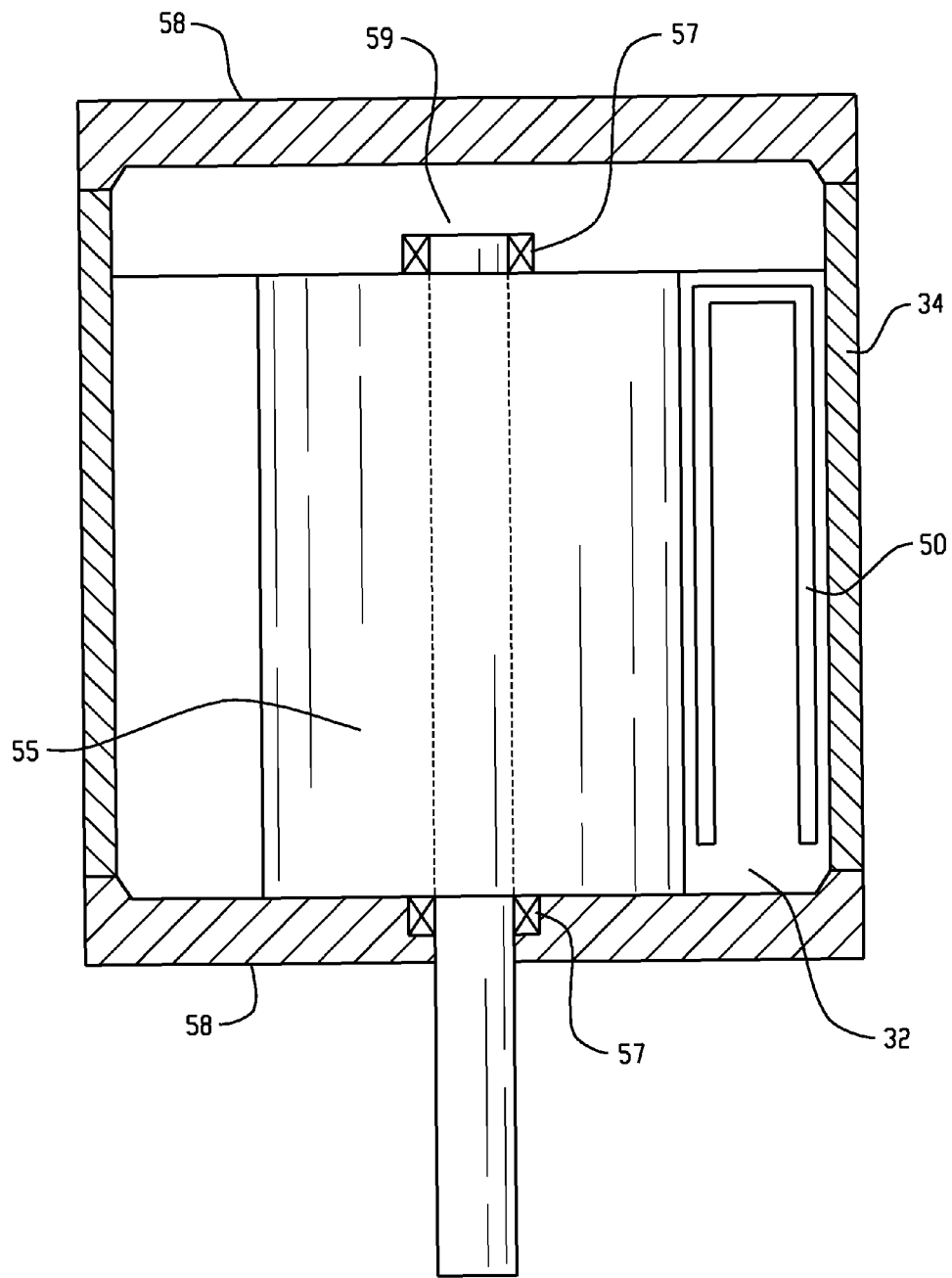
FIG. 6 is a cross-sectional view of an exemplary motor assembly including a thermostat clamp potted in place.

Turning to FIG. 6, the motor assembly 30 is illustrated in a more complete state including a rotor 55 with output shaft 56 supported within the housing 34. Bearings 57 support the rotor 55 for rotation. First and second end caps 58 enclose the ends of the housing 34. A thermostat clamp 50 is illustrated potted in place within the stator assembly 32.

Although the illustrated exemplary embodiment is t-shape in cross-section, other shapes are also possible. With reference to FIG. 7, a clamp 60 having a u-shape cross-section can be configured to be inserted in the spaces on each side of a respective winding, with each distal leg 62 being inserted between adjacent windings and the connecting portion 64 of the u-shape engaging a thermostat element. Similarly, FIG. 8 illustrates a thermostat clamp 70 having an L-shape wherein the long leg is configured to be inserted between adjacent windings while the short leg engages/secures a thermostat in position. It will be appreciated that thermostat clamps having other shapes are also possible.

During the process of assembling an electric motor, it will be appreciated that thermostat clamps in accordance with the present disclosure can be installed to secure one or more thermostats or other components in place. It will be appreciated that a general assembly method can include a hot drop of the stator assembly 32 into the housing 34. For example, the housing 34 is first heated to expand its inside diameter. The housing 34 is then placed over the stator assembly 32 and allowed to cool to room temperature. Because the stator assembly outside diameter is larger than the housing inside diameter, at room temperature, an interference fit develops as the housing 34 cools. This creates a compress pressure between the housing 34 and stator assembly 32 and secures the stator assembly 32 into the housing 34.

After hot drop, a front end cap, bearing, o-ring, and potting plug is installed to the assembly. The thermostats, and thermostat clamps are then positioned/installed. The thermostat clamps can be installed using needle-nose pliers or another tool. In some cases, the thermostat clamp can be installed by hand. The exemplary thermostat clamps are quickly and easily positioned thereby improving motor assembly efficiencies.

The motor assembly is then heated and potting material is poured into the housing to cover the stator assembly, thermostats, and clamps. The potted assembly is heated to cure the potting material, followed by a cooling process. The potting plug and excess potting material are removed, and the rotor assembly, rear bearing, and rear end cap are assembled to the housing. Finally, an encoder and rear cover are installed to finish the assembly.

It should also be appreciated that the exemplary thermostat clamps of the present disclosure will generally be non-conductive. Accordingly, certain materials such as non-conductive composites and the like are examples of suitable material from which the thermostat clamps can be made. One material that has been deemed suitable is rynite-fr945. In some constructions, the use of a UL-approved material may be required.

Although the exemplary embodiments have been shown and described in connection with securing thermostats to windings of an electric motor, it will be appreciated that aspects of this disclosure are applicable to securing a wide variety of components during assembly of electric motors and the like.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:
1. An electric motor assembly comprising:
a housing;
a rotor;
a stator supported in the housing, the stator having a plurality of concentrically arranged and spaced apart individual windings;

at least one thermostat for monitoring a temperature of at least one winding; and a thermostat clamp having a portion thereof interposed in a circumferential space between two adjacent windings of the stator, the thermostat confined between the thermostat clamp and at least one winding.

2. The electric motor assembly of claim 1, wherein the thermostat clamp is generally T-shape in cross-section.

3. The electric motor assembly of claim 1, wherein the thermostat clamp further comprises first and second spaced apart legs adapted to be received between adjacent windings.

4. The electric motor assembly of claim 1, wherein the thermostat clamp is comprised of a non-conductive material.

5. The electric motor assembly of claim 4, wherein the non-conductive material includes rynite-fr945.

6. The electric motor assembly of claim 1, further comprising potting material surrounding at least a portion of the stator, thermostat, and thermostat clamp.

7. An electric motor assembly comprising:
a housing;
a rotor;
a stator supported in the housing, the stator having a plurality of individual windings;
at least one thermostat for monitoring a temperature of at least one winding; and
a thermostat clamp interposed between adjacent windings of the stator, the thermostat confined between the thermostat clamp and at least one winding;
wherein the thermostat clamp includes a leg portion friction-fit between adjacent windings of the stator, and a head portion extending from the leg portion engaged with the thermostat.

8. The electric motor assembly of claim 7, wherein the leg portion includes a friction pad comprising a thickened portion thereof.

9. A stator assembly comprising:
a housing;
a stator supported in the housing, the stator having a plurality of concentrically arranged and spaced apart individual windings;
at least one thermostat for monitoring a temperature of at least one winding; and
a thermostat clamp having a portion thereof interposed in a circumferential space between two adjacent windings of the stator, the thermostat confined between the thermostat clamp and at least one winding.

10. The stator assembly of claim 9, wherein the thermostat clamp is generally T-shape in cross-section.

11. The stator assembly of claim 9, wherein the thermostat clamp further comprises first and second spaced apart legs adapted to be received between adjacent windings.

12. The stator assembly of claim 9, wherein the thermostat clamp is comprised of a non-conductive material.

13. The stator assembly of claim 12, wherein the non-conductive material includes rynite-fr945.

14. The stator assembly of claim 9, further comprising potting material surrounding at least a portion of the stator, thermostat, and thermostat clamp.

15. A stator assembly comprising:
a housing;
a stator supported in the housing, the stator having a plurality individual windings;
at least one thermostat for monitoring a temperature of at least one winding; and
a thermostat clamp interposed between adjacent windings of the stator, the thermostat confined between the thermostat clamp and at least one winding;
wherein the thermostat clamp includes a leg portion friction-fit between adjacent windings of the stator, and a head portion extending from the leg portion engaged with the thermostat.

16. The stator assembly of claim 15, wherein the leg portion includes a friction pad comprising a thickened portion thereof.

17. A method of assembling an electric motor comprising:
locating a stator having multiple windings within a housing;
positioning a thermostat relative to a winding of the stator; and
clamping the thermostat in place with a thermostat clamp, the clamping including inserting a leg of a thermostat clamp between adjacent windings of the stator, the thermostat clamp having a thickness slightly larger than a spacing between the adjacent windings whereby the thermostat clamp is frictionally retained; and
potting said stator, thermostat and thermostat clamp within the housing.

18. The method of claim 17, wherein the clamping further includes positioning a head portion of the thermostat clamp in engagement with the at least one thermostat.

19. The method of claim 17, wherein the potting includes installing a casting plug in the stator prior to applying a potting material.

20. The method of claim 19, further comprising removing the casting plug and installing a rotor in its place.

* * * * *